United States Patent [19]
Ritter, Jr. et al.

[11] 3,912,336
[45] Oct. 14, 1975

[54] PROTECTIVE SHROUD FOR THE DRIVE SPROCKET OF A TRACK-TYPE VEHICLE

[75] Inventors: Arthur J. Ritter, Jr., Metamora; David L. Perry, Peoria, both of Ill.

[73] Assignee: Caterpillar Tractor Company, Peoria, Ill.

[22] Filed: Aug. 2, 1974

[21] Appl. No.: 494,025

[52] U.S. Cl. ................................. 305/12; 74/609
[51] Int. Cl.² ............................................ B62D 55/20
[58] Field of Search .................. 305/11, 12, 13, 57; 180/95; 74/609, 611

[56] References Cited
UNITED STATES PATENTS

| | | | |
|---|---|---|---|
| 1,136,411 | 4/1915 | Davis | 74/609 |
| 1,812,543 | 6/1931 | White | 305/12 |
| 2,015,770 | 10/1935 | Vedder | 74/609 |
| 2,025,999 | 12/1935 | Myers | 305/57 |
| 3,082,044 | 3/1963 | Klemm | 305/12 |

Primary Examiner—Philip Goodman
Attorney, Agent, or Firm—Phillips, Moore, Weissenberger Lempio & Strabala

[57] ABSTRACT

A track-type vehicle comprises a pair of endless track assemblies each driven by a drive sprocket. An annular shroud is secured to the drive sprocket to continuously mask the common wrap angle between the drive sprocket and track assembly during vehicle operation.

12 Claims, 2 Drawing Figures

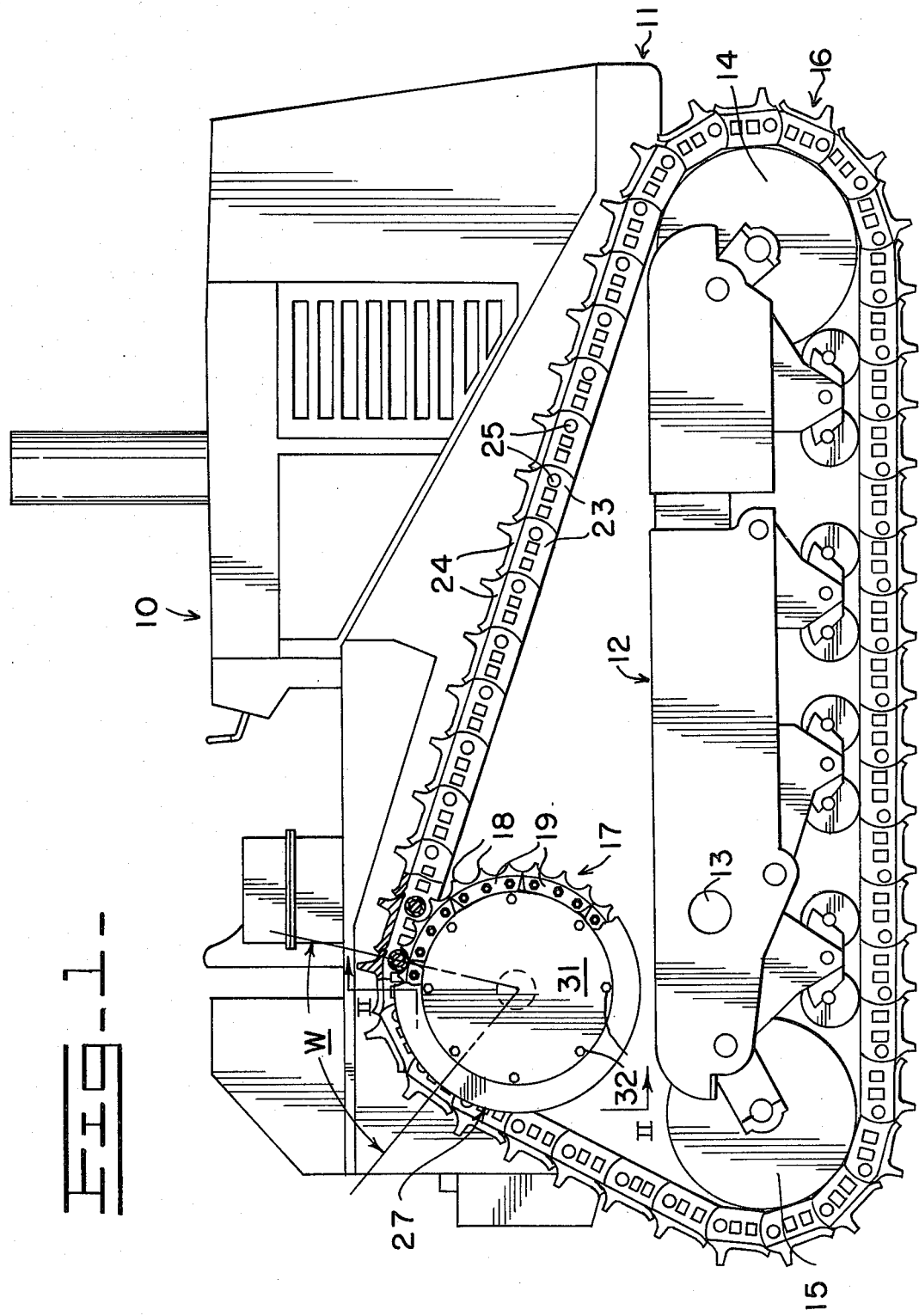
Fig_1.

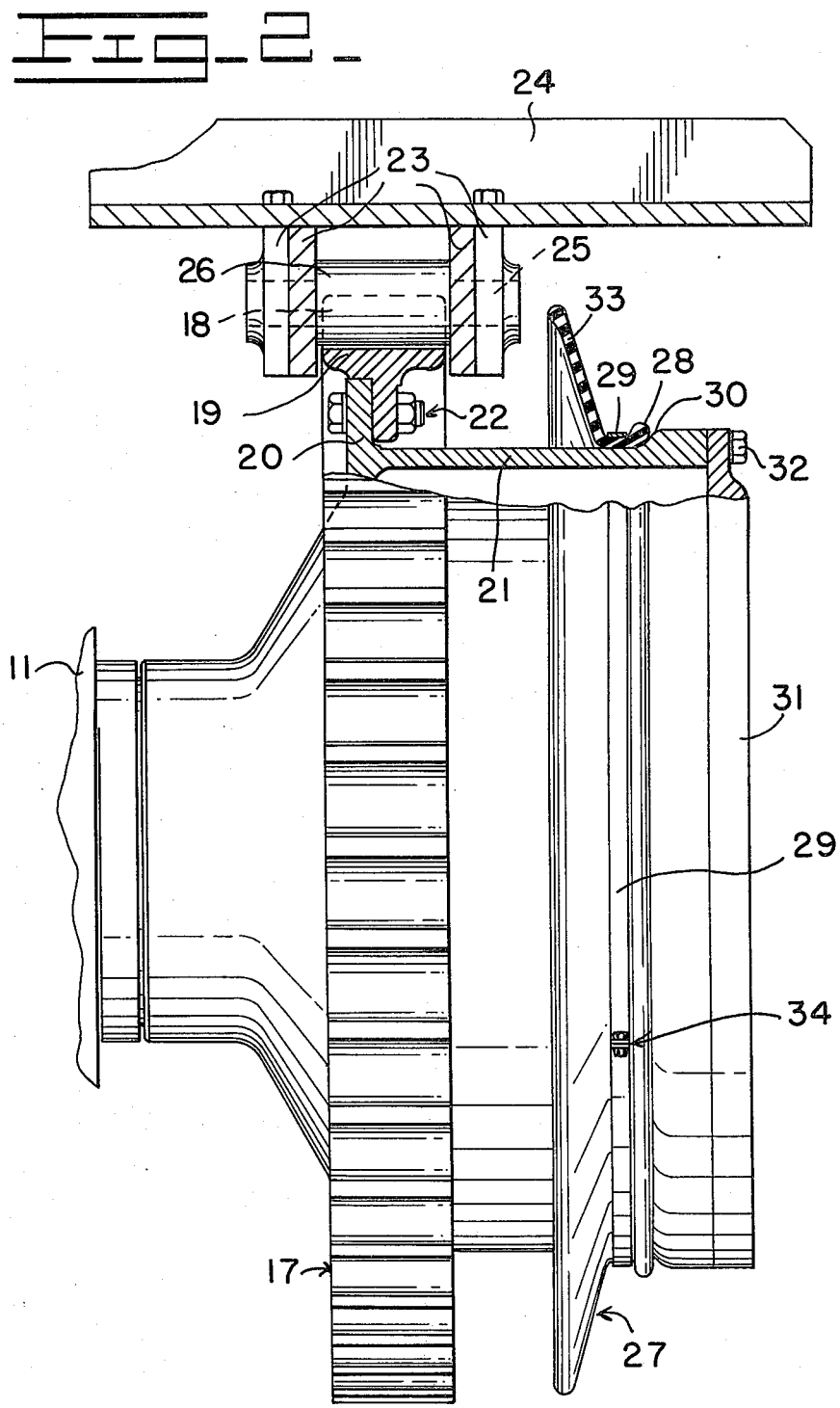

PROTECTIVE SHROUD FOR THE DRIVE SPROCKET OF A TRACK-TYPE VEHICLE

BACKGROUND OF THE INVENTION

The earthmoving industry is constantly striving to increase the safety features employed on earthworking machines, such as track-type tractors. One type of such tractor is fully disclosed in U.S. application Ser. No. 283,968, filed on Aug. 28, 1972 by Eldon D. Oestmann for a "High Drive-Track-Type Vehicle." Such application is assigned to the assignee of this application and is now U.S. Pat. No. 3,828,873.

The drive sprocket for the above-type vehicle engages an endless track assembly substantially above ground level to thus subject bystanders to potential injury due to the ejection of rocks and the like from the meshing sprocket and track assembly. In addition, the ingress of rocks or other debris into such area of mesh could cause mechanical damage thereat.

One possible solution to such problems would be one of attaching a large and bulky housing to the frame of the vehicle to cover the drive sprocket and attendant track assembly. In addition to its increased complexity and weight disadvantages, such a protective housing could cause more safety hazards than those overcome. In addition, such a housing would require complete dismantling thereof for servicing of the drive sprocket and its attendant mechanisms.

SUMMARY OF THIS INVENTION

An object of this invention is to overcome the above, briefly described problems by providing a non-complex and economical protective shroud for continuously masking an outboard side of a drive sprocket whereat it engages an endless track assembly. The track assembly and drive sprocket are engaged at a common wrap angle which is completely masked throughout a circumferential length thereof by the shroud.

BRIEF DESCRIPTION OF THE DRAWINGS

Other objects of this invention will become apparent from the following description and accompanying drawings wherein:

FIG. 1 is a partially sectioned, side elevational view of a track-type vehicle employing the shroud means of this invention thereon; and FIG. 2 is an enlarged, partially sectioned view taken in the direction of arrows II—II in FIG. 1.

DETAILED DESCRIPTION

FIG. 1 illustrates a track-type vehicle 10 of the kind disclosed in above-mentioned U.S. Pat. application Ser. No. 283,968. The vehicle comprises a main frame 11 having a pair of track roller or sub-frames 12 (one shown) pivotally mounted thereon by a common pivot means or pin 13. A pair of longitudinally spaced idlers 14 and 15 are rotatably mounted on the sub-frame to guide a triangularly shaped track assembly 16 therearound.

The upper apex of the track assembly is entrained at a wrap angle W about a drive sprocket 17, positioned vertically above idlers 14 and 15, having a plurality of teeth 18 formed circumferentially therearound. The sprocket teeth are preferably formed on a plurality of separate segments 19. Referring to FIG. 2, the segments are secured on an outboard side of a radially outwardly extending flange 20, formed integrally on an inboard end of a cylindrical hub 21, by fastening means 22 such as nuts and bolts.

The track assembly comprises a plurality of interconnected links 23 having track shoes 24 secured thereon in a conventional manner. Each pair of laterally spaced and circumferentially adjacent links are coupled together by a pin 25 on an intermediate bushing 26. In operation, rotation of sprocket 17 will function to engage teeth 18 with a respective number of bushings 26, throughout wrap angle W (FIG. 1), to drive the vehicle.

In accordance with this invention, an annular shroud means 27 has an annular flange portion 28 encircling an outboard end of hub 21 and secured thereon by a tightened circumferential metal band 29. The hub has an annular shoulder 30 formed thereon to engage an outboard end of flange portion 28 of the shroud to aid in preventing axial outward movement thereof. A circular cover plate 31 is releasably attached to an outboard end of hub 21 by a plurality of circumferentially disposed cap screws 32.

A conically shaped mask portion 33 of the shroud extends radially outwardly and inwardly a sufficient distance to at least mask a portion of links 23 throughout wrap angle W (FIG. 1) whereat the meshing between the drive sprocket teeth and bushings 26 occurs. In the preferred embodiment of this invention, the outer end of mask portion 33 terminates at a radial distance approximately equal to the outer periphery of the drive sprocket teeth and closely adjacent to the links.

The shroud preferably comprises a non-metallic resilient material, such as a stiff plastic or the like, capable of deflecting upon impact to loosen and expel impacted mud and the like which is adjacent thereto. In addition, the shroud will further aid in such loosening function. If so desired, metal band 28 may be split and secured together by a suitable fastening means 34 for quick release and installation purposes.

We claim:

1. In a track-type vehicle having an endless track assembly engaged by a rotatable drive sprocket at a common wrap angle thereof, the improvement comprising annular shroud means secured to said drive sprocket for continuously masking an outboard side of said engagement throughout a circumferential length of said wrap angle, said shroud means comprising a cantilevered mask portion extending radially outwardly to terminate at least approximately at the outer periphery of said drive sprocket and closely adjacent thereto.

2. The vehicle of claim 1 wherein said endless track assembly is triangular and is entrained around a pair of longitudinally spaced idlers and said drive sprocket, said drive sprocket positioned vertically above said idlers.

3. The vehicle of claim 1 wherein said drive sprocket comprises a cylindrical hub having said shroud means secured on an outboard end thereof.

4. The vehicle of claim 3 wherein said hub has an annular flange formed integrally thereon and extending radially outwardly from an inboard end thereof, said drive sprocket further comprising a plurality of circumferentially disposed sprocket teeth attached to said flange.

5. The vehicle of claim 4 wherein said sprocket teeth are formed on separable segments releasably attached to said flange.

6. The vehicle of claim 3 wherein said hub has an annular shoulder formed thereon and abutting an outboard end of said shroud means.

7. The vehicle of claim 3 wherein said shroud means comprises an annular flange portion secured to said hub by an annular band extending circumferentially about said flange portion.

8. The vehicle of claim 1 wherein said shroud means is composed of a plastic material and wherein said mask portion extends radially outwardly to mask at least a portion of said track assembly throughout the circumferential length of said wrap angle.

9. The vehicle of claim 1 wherein said mask portion is conically shaped and extends radially outwardly and inwardly towards said drive sprocket to form a mask adjacent thereto extending throughout the circumferential length of said wrap angle.

10. In a track-type vehicle having an endless track assembly engaged by a rotatable drive sprocket at a common wrap angle thereof, the improvement comprising annular shroud means secured on an outboard end of a cylindrical hub of said drive sprocket for continuously masking an outboard side of said engagement throughout a circumferential length of said wrap angle, said shroud means comprising an annular flange portion secured to said hub by an annular band extending circumferentially about said flange portion.

11. In a track-type vehicle having an endless track assembly engaged by a rotatable drive sprocket at a common wrap angle thereof, the improvement comprising annular shroud means secured to said drive sprocket for continuously masking an outboard side of said engagement throughout a circumferential length of said wrap angle, said shroud means being composed of a plastic material and comprising a mask portion extending radially outwardly to mask at least a portion of said track assembly throughout the circumferential length of said wrap angle.

12. In a track-type vehicle having an endless track assembly engaged by a rotatable drive sprocket at a common wrap angle thereof, the improvement comprising annular shroud means secured to said drive sprocket for continuously masking an outboard side of said engagement throughout a circumferential length of said wrap angle, said shroud means comprising a conically shaped mask portion extending radially outwardly and inwardly towards said drive sprocket to form a mask adjacent thereto extending throughout the circumferential length of said wrap angle.

* * * * *

Disclaimer and Dedication

3,912,336.—*Arthur J. Ritter, Jr.*, Metamore, and *David L. Perry*, Peoria, Ill. PROTECTIVE SHROUD FOR THE DRIVE SPROCKET OF A TRACK-TYPE VEHICLE. Patent dated Oct. 14, 1975. Disclaimer and Dedication filed Apr. 19, 1982, by the assignee, *Caterpillar Tractor Co.*

Hereby disclaims and dedicates to the Public the entire remaining term of said patent.

[*Official Gazette June 29, 1982.*]